United States Patent
Chandrashekar (10) Patent No.: US 10,292,061 B2
(45) Date of Patent: May 14, 2019

(54) METHOD OF TROUBLESHOOTING USING CUSTOMIZABLE TROUBLESHOOTING INDICATORS OVER BUCKETS OF VARIABLE TIME

(71) Applicant: NetScout Systems, Inc, Westford, MA (US)

(72) Inventor: Satishwar Chandrashekar, Bangalore (IN)

(73) Assignee: NetScout Systems, Inc, Westford, MA (US)

( * ) Notice: Subject to any disclaimer, the term of this patent is extended or adjusted under 35 U.S.C. 154(b) by 29 days.

(21) Appl. No.: 15/621,522

(22) Filed: Jun. 13, 2017

(65) Prior Publication Data
US 2018/0359650 A1 Dec. 13, 2018

(51) Int. Cl.
| | |
|---|---|
| *H04L 12/28* | (2006.01) |
| *H04W 24/06* | (2009.01) |
| *H04W 24/04* | (2009.01) |
| *H04L 12/26* | (2006.01) |
| *H04L 12/24* | (2006.01) |
| *H04W 24/08* | (2009.01) |
| *H04W 80/08* | (2009.01) |
| *H04W 24/10* | (2009.01) |
| *H04W 24/02* | (2009.01) |

(52) U.S. Cl.
CPC .......... *H04W 24/06* (2013.01); *H04L 41/069* (2013.01); *H04L 41/22* (2013.01); *H04L 43/04* (2013.01); *H04W 24/04* (2013.01); *H04W 24/08* (2013.01); *H04W 80/08* (2013.01); *H04W 24/02* (2013.01); *H04W 24/10* (2013.01)

(58) Field of Classification Search
CPC ...................................................... H04L 12/50
USPC ........................................................ 370/329
See application file for complete search history.

(56) References Cited

U.S. PATENT DOCUMENTS

| | | | |
|---|---|---|---|
| 9,277,431 B1 | 3/2016 | Podolsky | |
| 2011/0214050 A1* | 9/2011 | Stambaugh | G06F 3/04817 715/234 |
| 2015/0117244 A1 | 4/2015 | Williamson | |

OTHER PUBLICATIONS

Extended European Search Report for European Patent Application No. 18177472.0, dated Nov. 2, 2018.

* cited by examiner

*Primary Examiner* — Dang T Ton
(74) *Attorney, Agent, or Firm* — Locke Lord LLP; Scott D. Wofsy; Christopher J. Capelli (57) ABSTRACT

A method for facilitating diagnosis of problems experienced in a wireless network includes receiving a plurality of time-ordered events occurring in the wireless network. Each of the plurality of events is associated with at least one subscriber and has one or more attributes. The received time-ordered events are grouped into a plurality of categories based on time and based on the event attributes. A plurality of records associated with the plurality of categories is generated. Each record uniquely characterizes a corresponding category and has a uniform event density. An interactive graphical representation of the plurality of records is rendered to a user via a graphical user interface (GUI).

9 Claims, 6 Drawing Sheets

METHOD OF TROUBLESHOOTING USING CUSTOMIZABLE TROUBLESHOOTING INDICATORS OVER BUCKETS OF VARIABLE TIME

FIELD OF THE INVENTION

This specification is directed, in general, to network management, and, more particularly, to method of troubleshooting using customizable troubleshooting indicators over buckets of variable time duration having uniform event density.

BACKGROUND OF THE INVENTION

Cellular wireless communication networks provide nearly ubiquitous connectivity for mobile devices such as mobile phones, personal digital assistants, and wireless enabled laptop computers. To provide radio links to mobile devices, cellular network operators build and maintain a large number of cell towers or cell sites. For example, a large wireless network providing national coverage may comprise more than 50,000 cell sites. The quality of cellular communication service provided by cell sites depends on a number of different factors such as the number of subscribers in a coverage area of the cell site, the radio signal strength of the cell site, and the local environment including foliage. Because these factors change over time as seasons change and as population distributions change, it is a challenge for cellular network operators to evaluate the performance of their network and the quality of service provided to their customers.

Typically, in the cellular subscriber troubleshooting paradigm where analyzing the event listing and call trace and looking for various procedures, failures for durations ranging in hours is a primary method of troubleshooting, the network operators are facing a challenge of sifting through the captured event listings which can be quite extensive and separated into hundreds of pages. The navigation through the listing is somewhat "blind" and network operators may need multiple attempts to reach a particular problem area of interest. Various filtering methods or intelligent ways to search data (including, for example, based on procedure/failure/time) to reach areas of interest always come with at least partial loss of data (due to filtering) and loss of continuity of information or result in viewing only a subset of information. It would be advantageous for the network operators to view the events in a chronological order and yet have an ability to reach their problem area of interest in quickest possible ways. Since the problem area of interest varies depending on a particular network operator and also the nature of troubleshooting, providing an ability to define a particular user-defined area of interest and highlighting it during troubleshooting network issues would be useful.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method for facilitating diagnosis of problems experienced in a wireless network includes receiving a plurality of time-ordered events occurring in the wireless network. Each of the plurality of events is associated with at least one subscriber and has one or more attributes. The received time-ordered events are grouped into a plurality of categories based on time and based on the event attributes. A plurality of records associated with the plurality of categories is generated. Each record uniquely characterizes a corresponding category and has a uniform event density. An interactive graphical representation of the plurality of records is rendered to a user via a graphical user interface (GUI).

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

A communication network is a geographically distributed collection of nodes interconnected by communication links and segments for transporting data between end nodes, such as smart phones, pads, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Embodiments of the present invention relate to performing analysis of performance problems/failures in a computer network. A plurality of devices dedicated to monitoring data communicated via the network is used as a data source for the performed analysis. The plurality of devices summarizes a plurality of observed data packets into a plurality of time-ordered events for storage and processing. The event data set provides the analysis granularity required to extract rich network, service- and user-related metrics on devices, subscribers, base station ID, Location Area (LA), Routing Area (RA), QoS, and the like. Each event in the event data set may be updated in real-time. Depending on protocols, a network monitoring system extracts different sets of information, removes redundant information from the plurality of data packets, and focuses on the various types of performance problems affecting end users of numerous network applications, such as, but not limited to, failed procedures, failed signaling messages and corresponding error codes. The network monitoring system may retrieve and process multiple time-ordered event records and may group the events into a plurality of categories, as described below. Classification of events may further include arrangement of the plurality of categories into two or more user-defined category groups based on event attributes. Although a number of general and specific examples of the time-ordered events are provided below, it will be appreciated that these examples are intended to be non-limiting, and are provided merely for the sake of example and explanation. The performed analysis enables generation of records of events associated with the plurality of categories and enables generation of an interactive graphical representation of the grouped events and records to a user via an interactive Graphical User Interface (GUI). Each of the plurality of records uniquely characterizes a corresponding category and has a uniform event density. Hence, the described network monitoring system can facilitate more efficient and effective analysis of events, issues, performance or conditions of the network.

Figure 1:
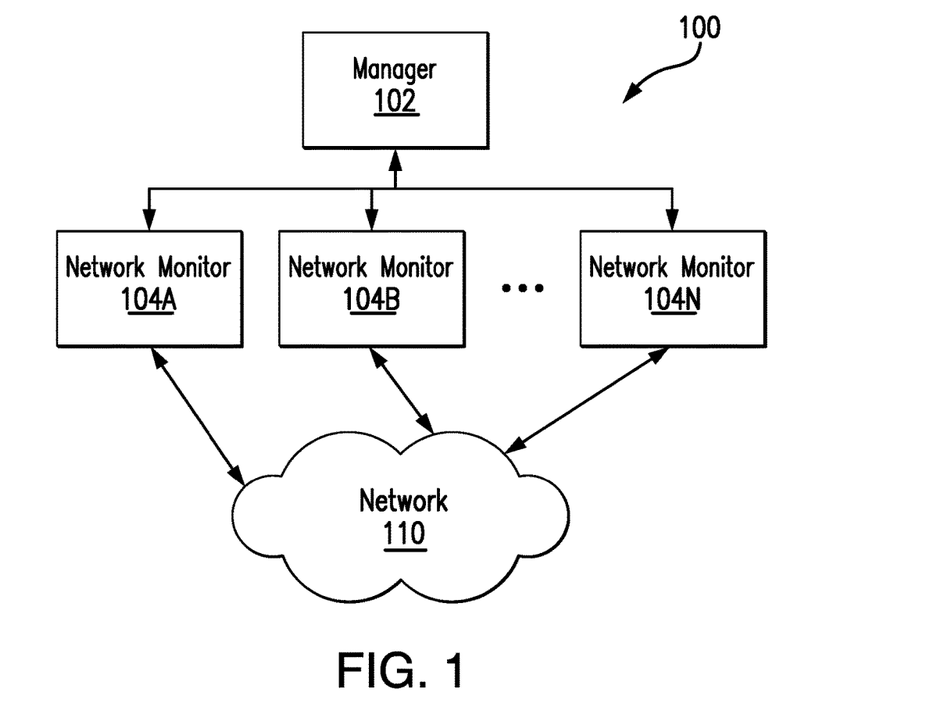
FIG. 1 illustrates the architecture of a system for monitoring data packets, according to one embodiment of the present invention.

FIG. 1 illustrates architecture of a system 100 for monitoring network data packets, according to one embodiment of the present invention. The network system 100 may include, among other components, a manager 102, one or more network monitors 104A through 104N (hereinafter collectively referred to as "the network monitors 104"), and a network 110. The network monitors 104 are connected to the network 110 to monitor network data packets traversing at certain locations or links of the network 110. The locations or the links connected to the network monitors 104 are preferably critical or important locations of the network 110. The manager 102 is connected to the network monitors 104 to set various operating parameters. Although the manager 102 is illustrated as being directly connected to the network monitors 104, the manager 102 may communicate with the network monitors 104 via the network 110 or other networks. The network monitors 104 may be located remotely from the manager 102. Alternatively, the manager 102 may be co-located with one of the network monitors 104 or embodied in one of the network monitors 104.

The operating parameters set by the manager 102 may include, among others, information stored in an event data set, the format of the event data set, and lengths of time the event data set should be stored.

The manager 102 is hardware, software, firmware or a combination thereof for managing the operation of the network monitors 104. The manager 102 may perform one or more of the following functions: (i) process information based on the received time-ordered event data set, (ii) receive parameters from a user for setting operation of the network monitors 104, (iii) send commands to the network monitors 104 to set parameters or preferences for their operations, (iv) present the collected information to the user, (v) group the received events into a plurality of categories, (vi) generate records concerning conditions and/or performance of the network 110, as described below in conjunction with network monitor's functionality.

The manager 102 may be embodied as a general purpose computing device installed with specialized software for performing one or more of these operations. Alternatively, the manger 102 is embodied as a specialized computing device.

In one embodiment, the manager 102 receives event data sets or selectively accesses event data sets from the network monitors 104, analyzes or correlates the sets of events, and produces multi-source information useful for diagnosis of the network 110 and other purposes. The event data sets are typically generated based upon actual traffic in real time and aggregated at different resolutions. The manager 102 may include a troubleshooting engine 214, described below in detail. The multi-source information is obtained by processing event data sets from multiple source network monitors 104, and hence, may represent overall condition or state of the network 110 or a subset of the network 110. The troubleshooting engine 214 assigns all received time-ordered events to one of the predefined categories based on time and based on event attributes or other information received from the network monitors 104.

The network monitors 104 are hardware, software, firmware or a combination thereof for monitoring data communication at various locations or links of the network 110. Each of the network monitors 104 may be deployed at certain locations or links of the network 110 to collect network data packets traversing the locations or links.

After collecting the network data packets, the network monitors 104 generate event data sets based on the received rich packet-flow data, and store the event data. In one embodiment, the events are generated and sent to the manager 102. In another embodiment, the event data sets are stored as a file in the network monitors 104 and then sent to the manager 102 at a later time.

The network monitor 104 may be a special purpose computing device or a software component (not limited to a single process) dedicated to monitoring data communicated via the network 110. Alternatively, the network monitor 104 may be a general purpose computing device with specialized software components installed thereon.

The network 110 may include a cellular network (e.g., a 3G, 4G, LTE network). The network 110 may include various network devices operating at different levels of protocols.

Figure 2:
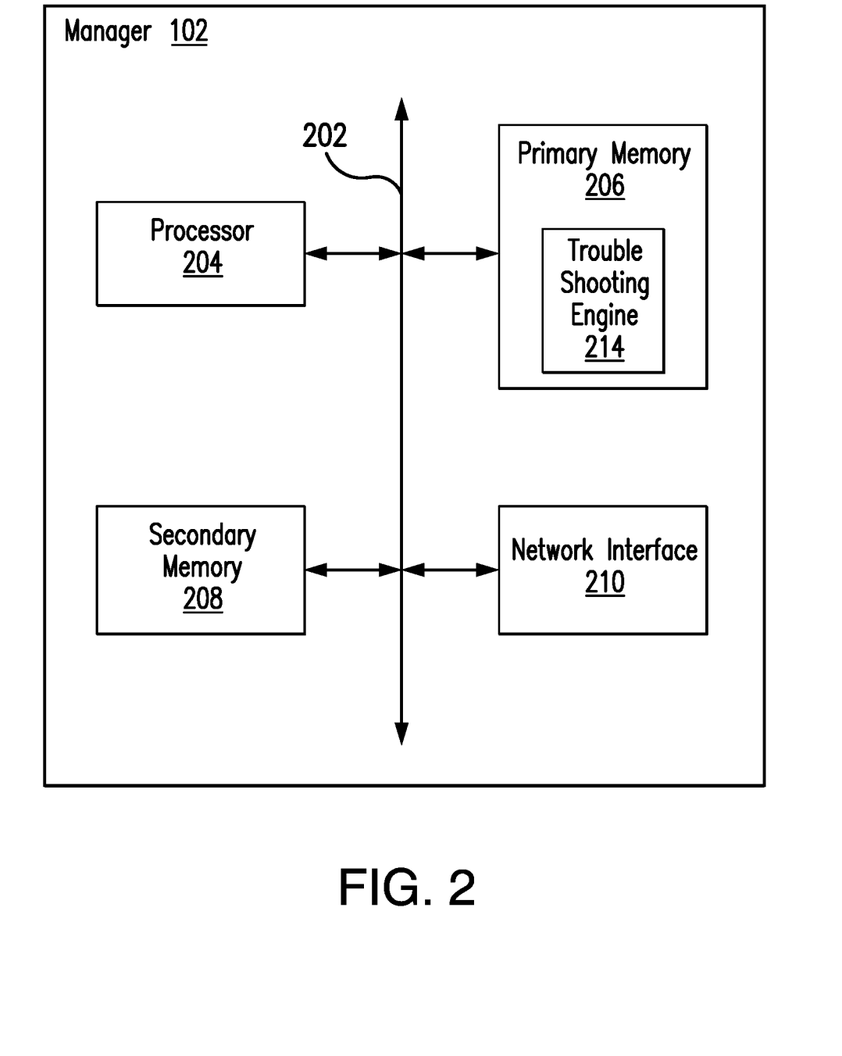
FIG. 2 is a block diagram of the network manager of FIG. 1, according to one embodiment of the present invention.

FIG. 2 is a block diagram of the manager 102, according to one embodiment of the present invention. The manager 102 may include, among other components, a processor 204, primary memory 206, secondary memory 208, and a network interface 210. These components are connected and communicate via a bus 202. The manager 102 may also include other components not illustrated in FIG. 2, such as user input devices (e.g., keyboard and mouse) and display devices (e.g., a display driver card).

The processor 204 executes computer instructions stored in the primary memory 206 and/or the secondary memory 208. Although only a single processor is illustrated in FIG. 2, two or more processors may be used to increase the computing capacity and the processing speed of the manager 102.

The primary memory 206 is a computer readable storage medium that stores, among other data, computer instruction modules for processing, storing and retrieving network data packets and/or event data sets. The primary memory 206 may be implemented in various data storage devices (e.g., Random-Access Memory (RAM)) having a faster access speed compared to the secondary memory 208. The faster access speed of the primary memory 206 allows the manager 102 to analyze event data sets and generate a plurality of event-based records approximately every hour.

The secondary memory 208 may be a secondary storage device for storing, among others, the processed event data sets and the generated records. The secondary memory 208 may be embodied, for example, as a solid-state drive, hard disk or other memory devices capable of storing a large amount of data compared to the primary memory 206.

The network interface 210 may include a NIC (network interface card) or other standard network interfaces to receive event data sets from the network monitor 104, and to communicate with other network interface devices coupled to the network 110. For example, the network interface 210 may be an Ethernet interface, a WiFi (IEEE 802.11) interface, or other types of wired or wireless network interfaces. In one embodiment, two or more network interfaces are used to communicate with different types of networks or perform specialized functions.

In one embodiment, the network interface 210 sends the event data sets directly to the troubleshooting engine 214. The network interface 210 may send one data set of events to the troubleshooting engine 214 for processing the event data and another event data set for storing in the secondary memory 208. Alternatively, the network interface 210 may send the event data to the troubleshooting engine 214 and not to the secondary memory 208. That is, the troubleshooting engine 214 receives the event data sets from the network interface 210, classifies the events into categories, generates the records, and sends the event data sets and generated records to the secondary memory 208. By receiving the event data directly from the network interface 210, the troubleshooting engine 214 can process the event data at a high speed without delays associated with accessing the secondary memory 208.

Although FIG. 2 describes the manager 102 as including the troubleshooting engine 214, the network monitor 104 may also include the troubleshooting engine 214 or respective components of the troubleshooting engine 214 to process event data received at the manager 102. In one embodiment, the network monitor 104 and the manager 102 both include the troubleshooting engine 214.

Figure 3:
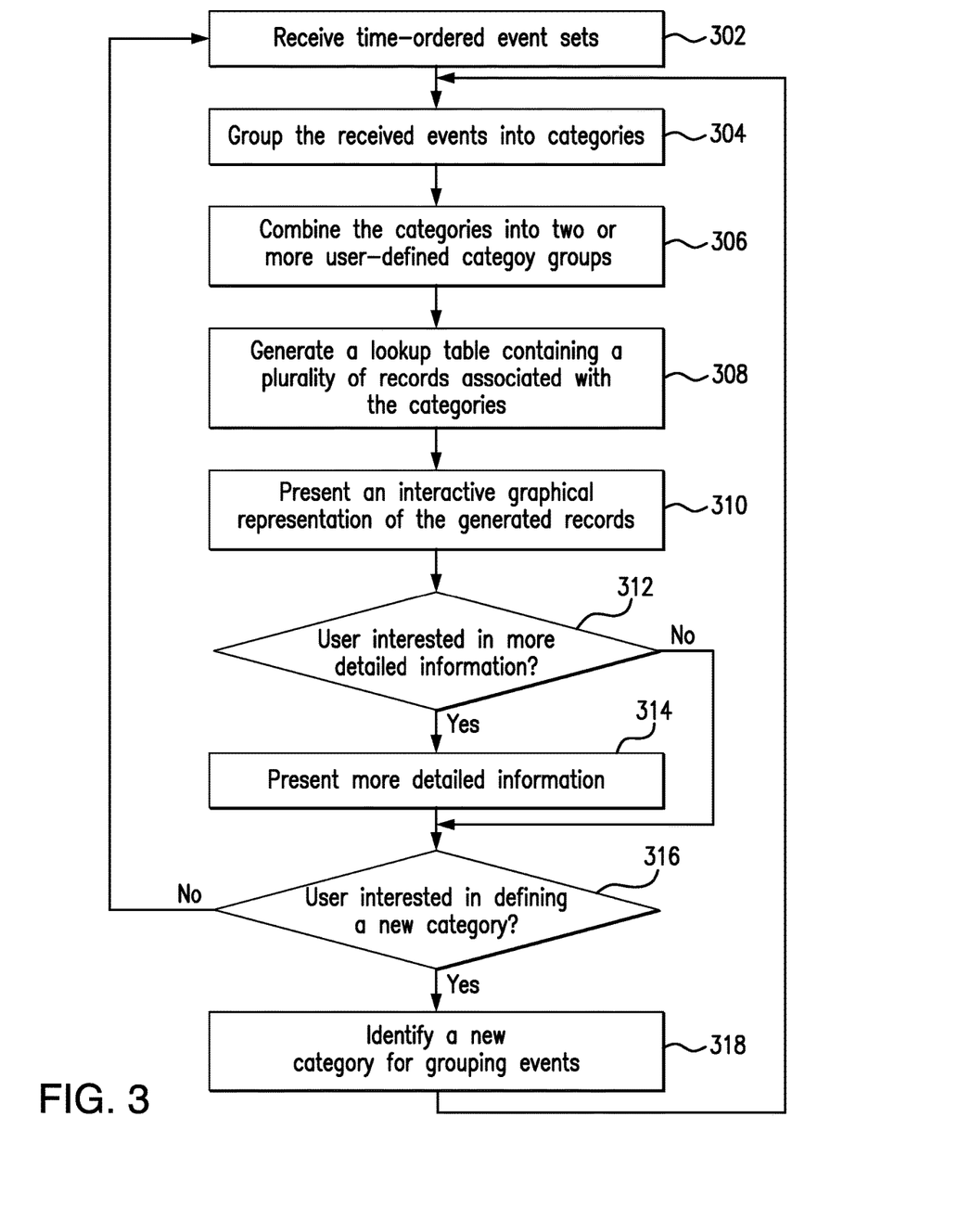
FIG. 3 is a flowchart illustrating a method for facilitating diagnosis of problems experienced in a wireless network in accordance with illustrative embodiments of the present invention.

FIG. 3 is a flowchart illustrating a method for facilitating diagnosis of problems experienced in a telecommunication network in accordance with illustrative embodiments of the present invention. Before turning to the description of FIG. 3, it is noted that the flow diagrams shown therein are described, by way of example, with reference to components shown in FIGS. 1 and 2, although these operational steps may be carried out in any system and are not limited to the scenario shown in the aforementioned figure. Additionally, the flow diagram in FIG. 3 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

At step 302, the troubleshooting engine 214 receives event data from the network interface 210. It should be noted that more than one network interface 210 can be used to receive a plurality of time-ordered events. Each event is related to an individual subscriber/customer of the network 100. Additionally, each event consists of one or more attributes, for instance containing the time when an event took place but may also contain information about type of event. It should be noted that each event data set is related to an individual customer of the system, in particular by associating the data set with a personal identifier, specifically with an anonymized personal identifier.

Therefore, each event data describes an individual event which was triggered by a specified customer of the network 100. A received data set may be labeled with a time period associated with events included in the data set. In one embodiment, the received data set may correspond to a one hour time period. The event attributes may include, among others, the time when an event took place, duration of the event, type of the event, network interfaces that captured and/or reported the event. Such event data may be sampled by the troubleshooting engine 214 at certain time intervals. These samples may be taken, for example, at five twelve minute intervals. Each event data set may contain information about some detected network events at the sample time that the data set is captured.

At step 304, the troubleshooting engine 214 dynamically "filters" all events into two or more categories or groups of events. Once categorized, the troubleshooting engine 214 associates a group of events with a certain category of transactions that can be grouped together. In one embodiment, the troubleshooting engine 214 classifies events into one of the following categories: i) session management events; ii) mobility management events; iii) authentication, authorization and accounting (AAA) events; iv) a SMS message control event; and v) a call control event.

According to an embodiment of the present invention, at 306, the troubleshooting engine 214 may combine the categories into two or more user-defined category groups for additional filtering purposes. In one exemplary embodiment, a first of the user-defined category groups of events may contain successful events while a second of the user-defined category groups contains failed events. In this manner, the troubleshooting engine 214 is enabled to present data to a user in various different formats and/or at different levels of granularity to facilitate easier analysis and diagnosis of problems experienced in a wireless network.

Next, at step 308, the troubleshooting engine 214 may generate a plurality of records associated with the plurality of categories created at step 304. Each record uniquely characterizes a corresponding category by deriving its characteristics from the group of time ordered events included in the corresponding category. Each record includes a plurality of columns including, but not limited to, description, start and end times associated with the category events, one or more user-defined category groups, network interfaces that captured and/or reported the events, and the like. In other words, each record characterizes a group of events distributed across time buckets, and multiple such buckets are represented as separate records. Each time bucket identifies a respective one of the records within a time domain.

According to an embodiment of the present invention, the troubleshooting engine 214 generates the plurality of records in such a manner that each produced record has a uniform event density. In other words, the number of events in each record generated by the troubleshooting engine 214 at step 308 is uniform across all records. In addition to generating the records, the troubleshooting engine 214 generates an interactive graphical representation of the records. In one embodiment, the records are graphically displayed as a lookup view (step 310).

Figure 4A:
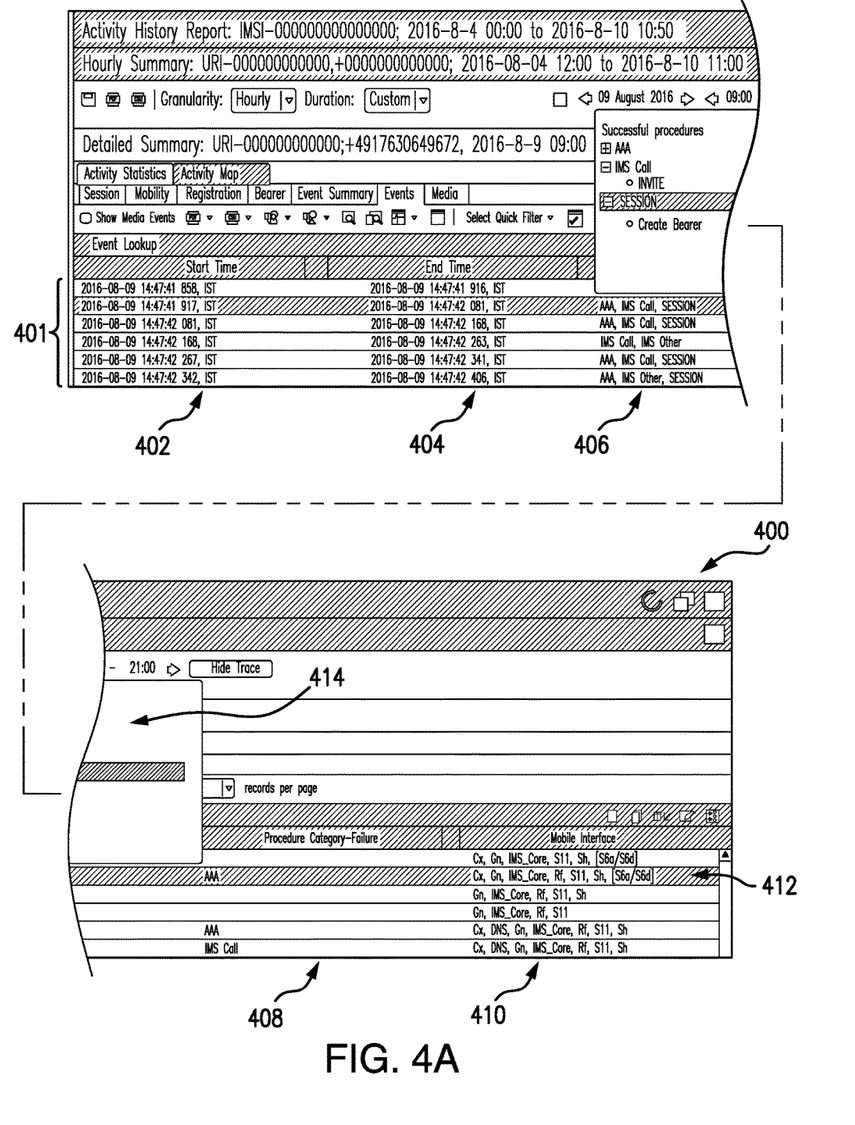
FIGS. 4A and 4B are diagrams of an exemplary lookup view that may be generated by the network manager of FIG. 1 according to an embodiment of the present invention.
Figure 4B:
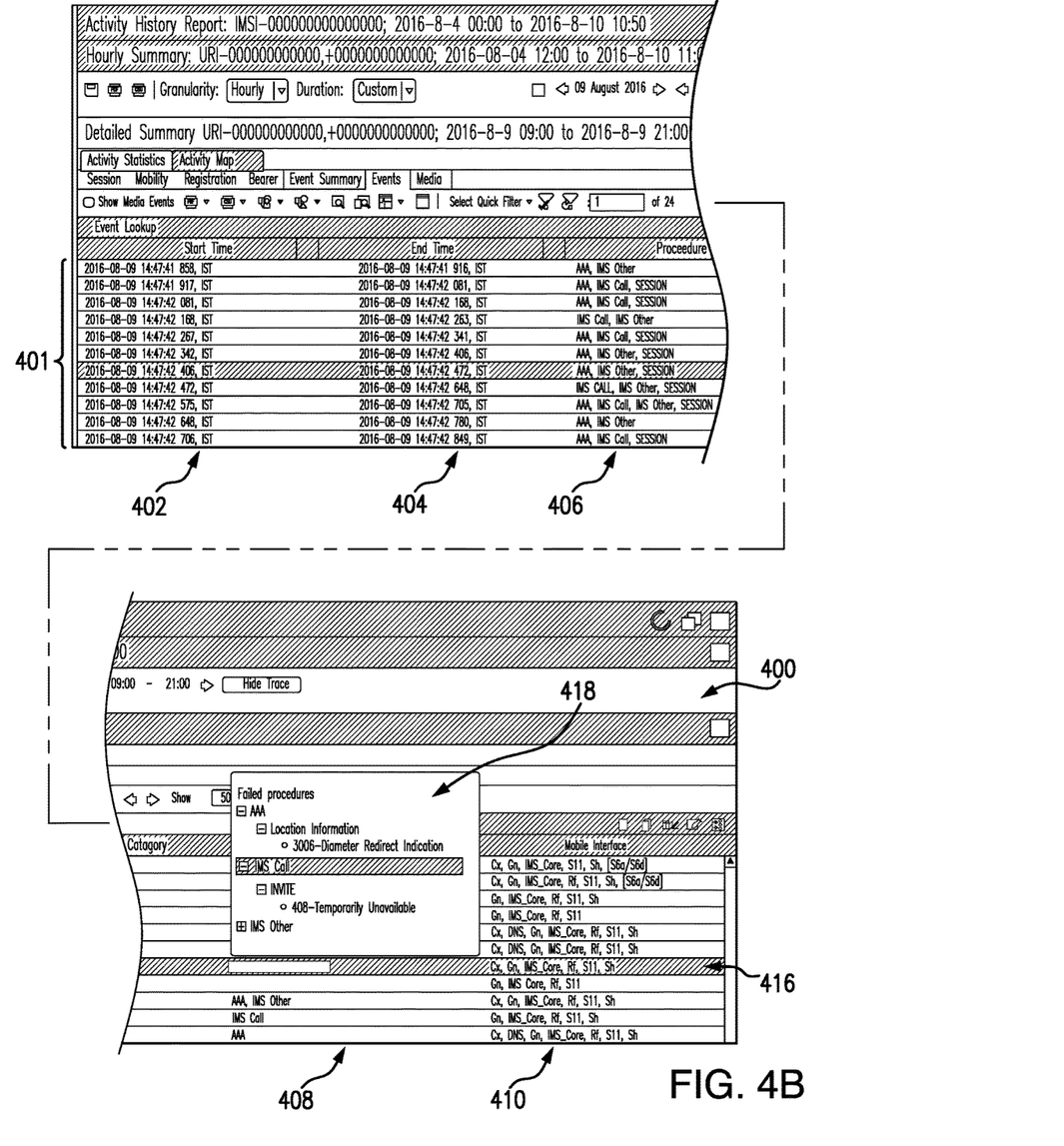

FIGS. 4A and 4B are diagrams of an exemplary lookup view screen that may be generated by the network manager of FIG. 1 according to an embodiment of the present invention. In this embodiment, the lookup view 400 displays the plurality of records 401 generated at step 308 and includes the following exemplary columns: category events start time 402, category events end time 404, successful events 406, failed events 408 and network interfaces 410. The lookup view 400 behaves like a table of contents, an index, a search feature, or some combination thereof to allow users to conveniently locate particular portions of the records (events) of interest. The lookup view 400 uniquely represents certain characteristics, in the form of the plurality of records 401 with references to search for records of the particular time duration. It should be noted that a similar importance can be associated with every record 401 in the lookup view 400 by virtue of the fact that source of data, which is the number of events for every record, is uniform across all records 401. This nature of event distribution by the troubleshooting engine 214 ensures that all records 401 are potentially equally valuable in terms of numbers of successful/failed events that they may be built from. Advantageously, the disclosed method enables higher efficiency in GUI representation of obtained information, by spreading meaningful information across the records 401 more uniformly. Such uniform graphical information usually makes it easier for consumption by the troubleshooting experts.

In one embodiment, the category characteristics displayed by the troubleshooting engine 214 via the lookup view 400 are indicative of the category of network events/transactions that are grouped into that particular record. These characteristics are represented by columns 402-410. In other words, each record's stored time period is collectively presented by the start time and end time columns 402 and 404, respectively. In addition, the displayed characteristics include user-defined category groups 406 and 408 as well as mobile interfaces 410 that were involved in acquisition of events stored in a particular record. As noted above, in one embodiment, each of the stored time-ordered events relates to at least one of the following: session management events, mobility management events, AAA events, SMS message control events or call control events.

According to an embodiment of the present invention, the troubleshooting engine 214 determines that user is interested in more detailed information (decision block 312) when user clicks on the interactive graphical view 400. Such detailed information may include event details and related information. In response to determining that the user is interested in additional information (decision block 312, "Yes" branch), the troubleshooting engine 214 presents such information in step 314. For instance, if a user selects second record 412 shown in FIG. 4A and clicks on the successful events column 406, in response, the troubleshooting engine 214 is configured to display one or more pop-up windows, such as a pop-up window 414 illustrated in FIG. 4A. However, it should be understood that the troubleshooting engine 314 is not limited to displaying one or more pop-up windows, and different types of interfaces, configurable by a user, for example, could also be used. The pop-up window 414 presents all successful events associated with the second record 412. In the illustrated case, the displayed successful events include an AAA event, an IP Multimedia Subsystem (IMS) call management event (invite) and a session management event (create bearer) associated with establishment of a bearer. In an alternative embodiment the pop-up window 414 may comprise a floating window.

If the user selects seventh record 416 shown in FIG. 4B and clicks on the successful events column 408, in response, the troubleshooting engine 214 is configured to display one or more pop-up windows, such as a pop-up window 418 illustrated in FIG. 4B. The pop-up window 418 lists all failed events of the selected record 416. In the illustrated case, the displayed failed mobility management events listed in window 418 include an AAA event, an IMS call management event and an IMS other mobility management event. In addition to the mobility management events stored in the selected record 416, the troubleshooting engine 214 may be configured to present other related data, such as detected error messages associated with each failed event. Advantageously, information presented in windows 414 and 418 further simplifies users' access to troubleshooting information contents from one interactive lookup view 400.

According to an embodiment of the present invention, the interactive graphical view 400 also presents an opportunity to perform even more detailed drill down search. The drilldown search may show, for example, data from system logs and network packet data relevant for the selected group of events. In one embodiment, the interactive graphical view 400 is configured to present more detailed event list data in a drill-down fashion for better understanding of the events summary data presented in FIGS. 4A and 4B. In this embodiment, users may access the event list page by, for example, double clicking the selected record, such as the second record 412 in FIG. 4A.

Figure 5:
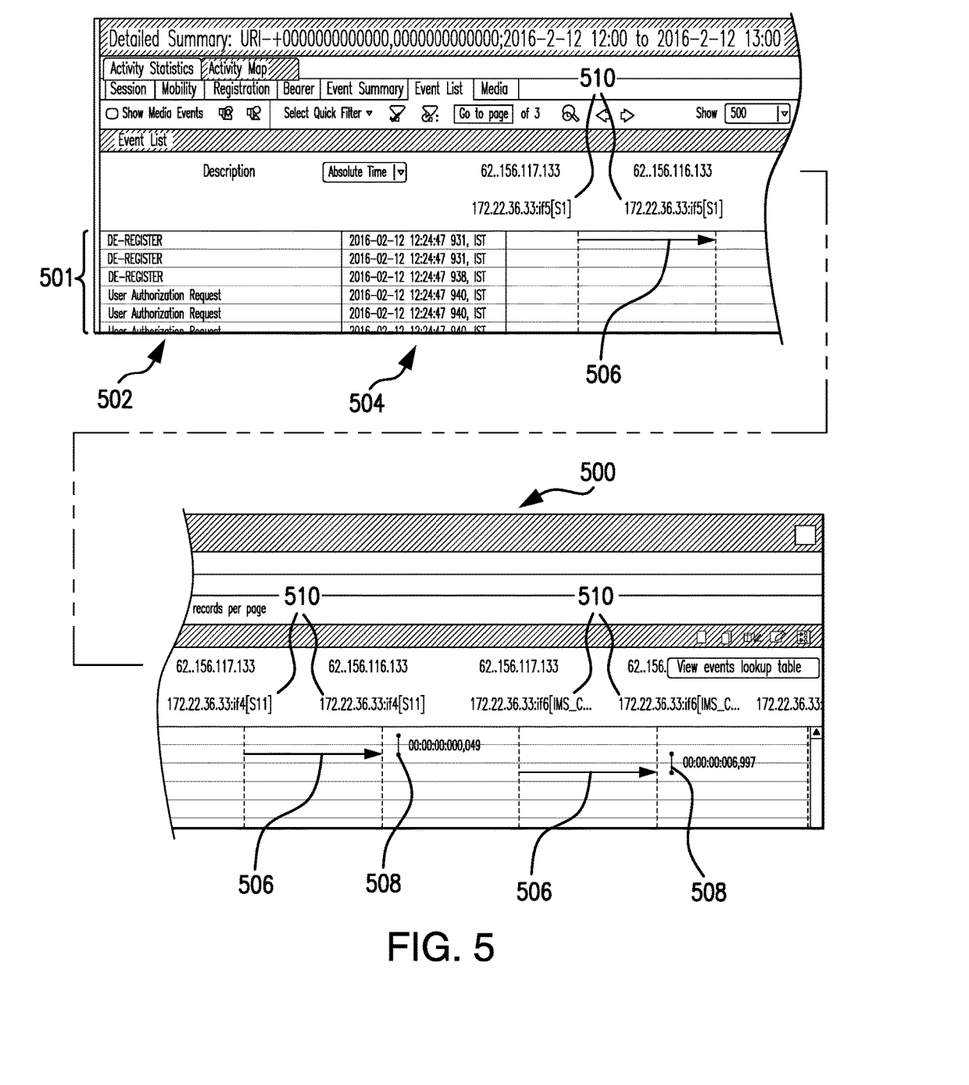
FIG. 5 is a diagram of an exemplary screen presenting more detailed event listing, according to an embodiment of the present invention.

FIG. 5 is a diagram of an exemplary screen presenting more detailed event list 500, according to an embodiment of the present invention. The event list view 500 may be displayed by the troubleshooting engine 214 at step 314, in response to user's request. The event list view 500 displays a plurality of events 501 that were grouped into the selected record 412 by the troubleshooting engine 214 at step 304. The events list 500 enables a user to view more detailed data for each of the grouped events. In the embodiment illustrated in FIG. 5, the more detailed data may include event description 502, relative or absolute time values 504 associated with each event, graphical representation of order of occurrence of the events 506 within the grouped sequence of events, absolute event duration time values 508, as well as IP addresses of the network elements 510 generating the corresponding events.

According to an embodiment of the present invention, referring back to FIG. 3, after presenting the more detailed information in step 314 or in response to determining that the user is not interested in more detailed information (decision block 312, "No" branch), the troubleshooting engine 214 may be configured to present an opportunity to users to provide any new categories that can be of interest to them. Accordingly, at step 316, the troubleshooting engine 214 may check if the user is interested in defining new categories. In one embodiment, the user may indicate such interest by updating an XML definition file that can be read by the troubleshooting engine 314 without limiting the scope of the disclosure. In this embodiment the XML definition file may include, but is not limited to, definitions for the categories, groups of events, and the like. In response to determining that users are interested in defining new category(ies) (decision block 316, "Yes" branch), the troubleshooting engine 214 may identify a new category for grouping events at step 318 from the XML definition file. The troubleshooting engine 214 may be configured to dynamically provide the updated lookup view 400 in response to the new category(ies) of interest provided by repeating steps 304-310 described above with respect to a new category. In some embodiments, the troubleshooting engine 214 may be configured to automatically define a new category based on some additional analysis of the plurality of records displayed by the interactive graphical view 400.

Advantageously, the various embodiments described herein provide more efficient troubleshooting method of various issues in wireless networks. These embodiments provide a single interactive graphical view depicting indicators, troubleshooting points of interest and a timeline of important events happening during the period of interest. Depicted summarized event data is defined as temporal based information collected by a plurality of monitoring devices and classified at a successful, failed and other possible user-defined categorical levels that documents performance levels as a context for more detailed analysis. In some embodiments, the method may also include receiving input reflecting selection of a particular record (or a time bucket) and displaying a drill-down view that provides further information of interest about events included in the record in a quickest possible way. Further, the disclosed method may enable users to generate new categories of events for additional analysis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network device for facilitating diagnosis of problems experienced in a wireless network, the network device comprising:
    a network interface configured to receive program instructions to receive event data occurring in the wireless network from one or more network monitoring devices positioned at one or more locations in the wireless network, wherein the event data includes a plurality of events associated with at least one subscriber and having one or more attributes;
    a memory for storing processed event data sets and generated records;
    a troubleshooting engine;
    a processor disposed in communication with the memory and troubleshooting engine, wherein the processor upon execution of instructions is configured to:
        send the received event data to the troubleshooting engine for analysis thereof and group the received time-ordered events associated with the event data into a plurality of categories based on time and event attributes;
        send the grouped time-ordered events associated with the event data from the troubleshooting engine to the memory and generate a plurality of records associated with the plurality of categories in the memory, wherein each record uniquely characterizes a corresponding category and has a uniform event density; and
        render to a user an interactive graphical representation of the plurality of records via a graphical user interfaces.

2. The network device of claim 1, wherein each of the plurality of categories is associated with a time period represented by the corresponding category.

3. The network device of claim 1, wherein the troubleshooting engine is configured to group the received time-ordered events and is further configured to combine the plurality of categories into two or more user-defined category groups based on the event attributes.

4. The network device of claim 3, wherein a first of the user-defined category groups contains successful events and wherein a second of the user-defined category groups contains failed events.

5. The network device of claim 2, wherein each of the received plurality of time-ordered events relates to i) a session management event, ii) a mobility management event, iii) an authentication, authorization, and accounting (AAA) event, iv) an SMS message; and v) a call control event.

6. The network device of claim 1, wherein the one or more attributes of an event attribute include at least a mobile interface receiving the event.

7. The network device of claim 1, wherein the interactive graphical representation is configured to render the plurality of records at two or more levels of detail based on an input from a user.

8. The network device of claim 1, wherein the troubleshooting engine is further configured to read an XML definition file to determine whether a user defined a new category for grouping the received time-ordered events.

9. The network device of claim 7, wherein at least one of the two or more levels of details is rendered via a pop-up window.

* * * * *